United States Patent Office 3,535,322
Patented Oct. 20, 1970

3,535,322
1 - PHENYL - 1,5 - METHANO-3-BENZAZOCINE DERIVATIVES AND PROCESS OF PREPARATION
Minas P. Georgiadis, Chomedy, Martin A. Davis, Montreal, Quebec, and Karel Wiesner, Fredericton, New Brunswick, Canada, assignors to American Home Products Corporation, New York, N.Y., a corporation of Delaware
No Drawing. Filed July 2, 1968, Ser. No. 741,893
Int. Cl. C07d 39/00
U.S. Cl. 260—293                                   8 Claims

ABSTRACT OF THE DISCLOSURE

There are disclosed herein 1,2,3,4,5,6-hexahydro-1,5-methano-1-phenyl - 3 - benzazocine and its corresponding N-methyl, N-ethyl, N-allyl, N-dimethylallyl, N-anilinoethyl, N-anilinopropyl, N-phenethyl, N-phenylpropyl, N - cinnamyl, N - 2 - (p - aminophenethyl)- and N - 3 - (p-amino-phenyl)propyl derivatives as well as the corresponding 1,2,3,4,5,6 - hexahydro-1,5-methano-1-phenyl-3-benzazocine-4,6-dione, -6-hydroxy-4-one, -6-chloro-4 - one and -4-one used as intermediates in their syntheses. The compounds possess analgetic, anticonvulsant and antibacterial activities, and a process for their preparation as well as methods for their use are also disclosed.

This invention relates to a novel series of methanobenzazocines, the processes for the preparation of these compounds and to intermediates used for their preparation.

More specifically this invention relates to substituted 1-phenyl-1,5-methano - 3 - benzazocine derivatives which may preferably be represented by Formula I:

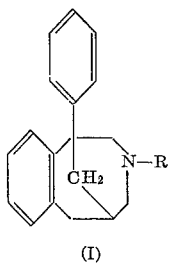

(I)

in which R represents hydrogen, or an organic group such as an alkyl group containing from one to nine carbon atoms or a substituted alkyl group containing from two to nine carbon atoms, such as, for example, a methyl, ethyl, allyl, 3,3-dimethylallyl, 2-anilinoethyl or a 3-anilinopropyl group, an aralkyl group or a substituted aralkyl group containing eight or nine carbon atoms such as, for example, phenethyl, 3-phenylpropyl, cinnamyl, 2- (p - aminophenethyl) or a 3 - (p - aminophenyl)propyl group.

This invention includes the non-toxic, pharmaceutically acceptable acid addition salts of the 1 - phenyl - 1,5-methano-3-benzazocine derivatives of this invention. Such salts are prepared from suitable acids, such as inorganic acids, for instance, hydrochloric, hydrobromic, sulfuric, phosphoric, or sulfamic acid; or organic acids, for instance, acetic, maleic, lactic, ethane-disulfonic, gylcolic, salicylic and fumaric acids. The acid addition salts are prepared by reacting the base with either one equivalent of acid or preferably with an excess in an organic solvent such as ether or an ethanol-ether mixture. Alternatively, an acid salt of the base, say the hydrochloride, can be reacted with a salt such as the ammonium salt of an organic acid in an aqueous mixture to form an insoluble salt by double decomposition.

The novel methanobenzazocines of this invention have been found to possess interesting pharmacological properties which render them useful as synthetic medicinals. More particularly these methanobenzazocines in standard pharmacological tests, for example, in procedures similar to those described by Ralph Banziger in "Pharmacologic Techniques in Drug Evaluation," Year Book Medical Publishers, page 392, for the testing of analgesic agents, have exhibited utility as analgesic agents, as do the analgesics, morphine and phenazocine. However, unlike morphine and phenazocine, the methanobenzazocines of this invention are substantially free of deleterious pharmacodynamic effects. An example of such a deleterious effect is the excitatory effect of morphine on the central nervous system observed in both mice, see D. L. J. Bilbey et al., Brit. J. Pharmacol., 15, 540 (1960), and man, see L. A. Woods in "Pharmacology in Medicine," V. A. Drill, ed. 2nd ed., McGraw-Hill Book Company, pages 218–221. The lack of excitation properties for the methanobenzazocines is demonstrable in pharmacological procedures, such as, for example, the procedure used by Bilbey, see reference cited above.

The methanobenzazocines exhibit other desirable pharmacological properties. They possess, for example, anticonvulsant properties in warm-blooded animals as measured by the ability to protect against seizures induced by electroshock. The dosages required to elicit this effect are substantially below those causing toxicity or motor deficits. Moreover, the compounds possess antibacterial properties against a number of gram-positive and gram-negative microorganisms such as, for example, *Staphylococcus pyogenes, Sarcina lutea, Streptococcus fecalis, Escherichia coli, Aerobacter aerogenes, Salmonella pullorum, Proteus mirabilis* and *Proteus vulgaris*.

When the methanobenzazocines of this invention are employed as analgesic agents in warm-blooded animals, e.g. rats, either alone or in combination with pharmacologically acceptable carriers, the proportion of which is determined by the solubility and chemical nature of the compound, chosen route of administration and standard biological practice. For example, they may be administered orally in solid form containing such excipients as starch, milk sugar, and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 0.1 mg. to about 100 mg. per kilo although as aforementioned variations will occur. However, a dosage level that is in the range of from about 0.5 mg. to about 10 mg. per kilo is most satisfactory. Such doses may be administered once or twice a day, as required.

In preparing the compounds of this invention we prefer to use the following procedure.

Thus, 1-carboxymethyl-1-phenyl-4-tetralone (II), prepared as described by G. N. Walker et al. in J. Org. Chem. 30, 2973 (1965) is treated in an inert solvent such as, for example, tetrahydrofuran, with triethylamine and ethyl chloroformate, followed by sodium azide to afford the acid azide of Formula III. Heating this azide in an inert solvent such as, for example, dry benzene, affords the isocyanate of Formula IV in excellent yield. This isocyanate may then be cyclised to a 1-phenyl-1,5-methano-3-benzazocine derivative by heating in an inert solvent such as, for example benzene or toluene, with a strong acid, such as, for example, anhydrous p-toluenesulfonic acid. The yield of cyclised product thus formed (V, R=H) is, however, low and we prefer to prepare the N-substituent derivatives of V, where R is as defined above, by a direct and far more efficient procedure. To this end, the isocyanate of Formula IV is heated in an inert solvent, such as, for example dry toluene, with an alkaline condensing agent. The preferred alkaline condensing agent for this synthesis is sodium hydride used in a molar excess, preferably about two moles of sodium hydride per mole of the isocyanate. When the cyclisation has been completed the resultant N-sodio derivative of the keto-lactams 1,2,3,4,5,6-hexahydro - 1,5 - methano-1-phenyl-3-benzazocine-4,6-dione of Formula V is treated with water, thus yielding the same compound of Formula V in which R represents hydrogen. However, it is preferred at this stage to treat the above sodio derivative with an organic halide of the Formula RX wherein R is an organic group as defined above and X is selected from the group chlorine, bromine or iodine. The alkylation is allowed to proceed by heating the reaction mixture for a suitable period of time and the keto lactam of Formula V is isolated in the conventional manner.

In order to obtain the desired end-products, the keto lactam of Formula V is catalytically reduced in the presence of a noble metal, such as, for example, platinum, to afford the correspondingly N-substituted hydroxy-lactam of the Formula VI, i.e. the corresponding derivatives of 1,2,3,4,5,6-hexahydro-6-hydroxy-1,5-methano-1-phenyl-3-benzazocine-4-one. Treatment of this latter compound with thionyl chloride then affords the corresponding 6-chloro lactam of Formula VII, which in turn is converted to the corresponding lactam of Formula VIII by catalytic reduction in the presence of palladium-on-charcoal, i.e. the corresponding 1,2,3,4,5,6-hexahydro-1,5-methano-1-phenyl-3-benzazocine-4-one derivative. Chemical reduction of said last-named compound of Formula VIII is achieved by treatment with an alkali metal aluminum hydride, such as for example, lithium aluminum hydride in tetrahydrofuran solution. After decomposition of the complex by addition of water the corresponding 1-phenyl-1,5-methano-3-benzazocines of Formula I are obtained, and may optionally be converted to their pharmacologically acceptable salts.

When it is desired to obtain 1,2,3,4,5,6-hexahydro-1,5-methano-1-phenyl-3-benzazocine, i.e. the compound of Formula I in which R represents hydrogen, it is preferred to demethylate the compound of Formula I in which R represents the methyl group by treatment with cyanogen bromide or with ethyl chloroformate and hydrolizing the resultant N-cyano or N-carbethoxy derivative. The resultant compound of Formula I, in which R represents hydrogen may then be alkylated by treatment with sodium hydride and an organic halide of the Formula RX in which R represents an organic group as defined above.

Alternatively, the above N-alkylated compounds may also be obtained by acylating the compound of Formula I in which R represents hydrogen and reducing the resulting acylates with lithium aluminum hydride to the corresponding compounds of Formula I in which R represents an organic group as defined above.

The following formulae, in which R has the significance defined above, and examples will serve to illustrate this invention.

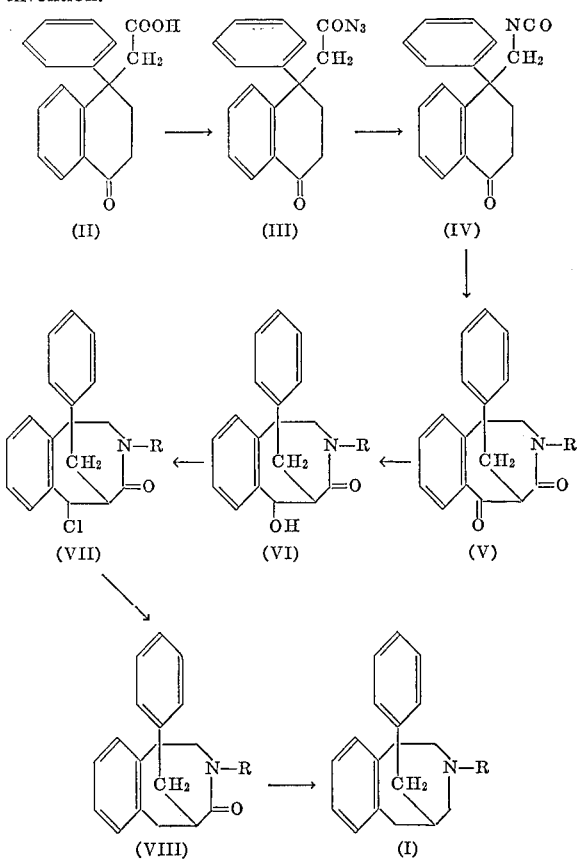

EXAMPLE 1

(4-phenyl-1-tetralone-4)acetyl azide

To an ice cold solution of 4-phenyl-4(carboxymethyl)-1-tetralone (2.8 g.) and triethylamine (1.0 g.) in anhydrous tetrahydrofuran (100 ml.), ethyl chloroformate (1.2 g.) in 15 ml. of tetrahydrofuran is slowly added with stirring. After completion of the addition the mixture is stirred for one hour, and a solution of sodium azide (2 g.) in 15 ml. of distilled water is added in one portion. The precipitate is removed by filtration, washed with tetrahydrofuran and the combined filtrates are evaporated under reduced pressure at 30–40° C. The residue is taken up in methylene dichloride and washed with cold 2% sodium hydroxide, 2% hydrochloric acid, and water to neutrality. The aqueous layers are backwashed twice, in turn, with methylene dichloride, then the organic layers are combined and dried over magnesium sulfate. Evaporation of the solvent at low temperature an addition of ether yields the title compound with M.P. 80–82° C. (dec.)

$\nu_{max.}^{Nujol}$ 2140, 1710, 1682 cm.$^{-1}$

EXAMPLE 2

(4-phenyl-1-tetralone-4) methyl isocyanate

A solution of (4-phenyl-1-tetralone-4) acetyl azide (5 g.), obtained as described in Example 1, in dry benzene (300 ml.) is refluxed for 20–25 minutes, the solvent is evaporated and anhydrous ether is added, to yield the title compound with M.P. 153–154° C.

$\nu_{max.}^{CHCl_3}$ 2280, 1680 cm.$^{-1}$

EXAMPLE 3

1,2,3,4,5,6-hexahydro-1,5-methano-1-phenyl-3-benzazocine-4,6-dione

Sodium hydride (1 g., 54% suspension) is refluxed in dry toluene using a Dean-Stark water separator and some toluene is distilled off. (4-phenyl-1-tetralone-4)methyl isocyanate (2.1 g.) is added and refluxing is continued for 20–25 minutes. The mixture is cooled and water is added cautiously. Neutralization with acetic acid, washing with water, back-extraction with chloroform, drying, and evaporation of the solvents yields the title compound with M.P. 241–242° C. after crystallization from benzene-ethanol $\nu_{max.}^{CHCl_3}$ 3400, 1702, 1665 cm.$^{-1}$

EXAMPLE 4

1,2,3,4,5,6-hexahydro-1,5-methano-N-methyl-1-phenyl-3-benzazocine-4,6-dione (4-phenyl-1-tetralone-4)methyl isocyanate (500 mg.) and sodium hydride (400 mg.) are refluxed in dry toluene for 20–25 minutes, removed from heating, and methyl iodide (.2 g.) is added dropwise. After the addition of methyl iodide refluxing is continued for three hours. Water is added cautiously to the cooled mixture and the mixture is worked up as described in Example 3, to give the title compound with M.P. 230° C. after crystallization from toluene.

EXAMPLE 5

1,2,3,4,5,6-hexahydro-6-hydroxy-1,5-methano-N-methyl-1-phenyl-3-benzazocin-4-one A mixture of 8.5 g. of 1,2,3,4,5,6-hexahydro-1,5-methano-N-methyl-1-phenyl-3-benzazocine-4,6-dione obtained as described in Example 4 and 200 ml. of absolute ethanol containing 1.6 g. of platinum oxide is treated with hydrogen under 50 p.s.i. at room temperature (24° C.) for 18 hours. The catalyst is filtered off, the filtrate is evaporated and the residue is crystallized from a mixture of ethyl acetate and petroleum ether to yield the title compound with M.P. 163–165° C.

In the same manner, but using an equivalent amount of 1,2,3,4,5,6-hexahydro-1,5-methano-1-phenyl-3-benzazocine-4,6-dione, obtained as described in Example 3, as starting material and proceeding as above, 1,2,3,4,5,6-hexahydro-6-hydroxy-1,5-methano-1-phenyl-3-benzazocin-4-one is obtained.

EXAMPLE 6

1,2,3,4,5,6-hexahydro-6-chloro-1,5-methano-N-methyl-1-phenyl-3-benzazocin-4-one

A mixture of 1,2,3,4,5,6-hexahydro-6-hydroxy-1,5-methano-N-methyl-1-phenyl-3-benzazocin-4-one (6 g., obtained as described in Example 5) and 6 ml. of thionyl chloride in 40 ml. of methylene chloride is refluxed for six hours and evaporated. The residue is taken up in ether, and the ether is evaporated, to incipient precipitation. The mixture is cooled (0° C.) and filtered to yield the title compound with M.P. 196–197° C. after crystallization from ethyl-acetate-hexane.

In the same manner but using an equivalent amount of 1,2,3,4,5,6-hexahydro-6-hydroxyl-1,5-methano-1-phenyl-3-benzazocin-4-one as starting material and proceeding as above 1,2,3,4,5,6-hexahydro-6-chloro-1,5-methano-1-phenyl-3-benzazocin-4-one is obtained.

EXAMPLE 7

1,2,3,4,5,6-hexahydro-1,5-methano-N-methyl-1-phenyl-3-benzazocin-4-one

To a solution of 1,2,3,4,5,6-hexahydro-6-chloro-1,5-methano-N-methyl-1-phenyl-3-benzazocin-4-one (5 g., obtained as described in Example 6) in methanol (90 ml.) 5% palladium on charcoal (0.8 g.) and 5 g. potassium hydroxide is added. Hydrogenolysis is completed within 30 minutes under 50 p.s.i. hydrogen pressure. The catalyst is removed by filtration, the title compound is precipitated by addition of water and crystallized from ethanol-hexane or benzenehexane to M.P. 181.5–182° C.

In the same manner, by using equivalent amounts of 1,2,3,4,5,6-hexahydro-6-chloro-1,5-methano-1-phenyl-3-benzazocin-4-one, obtained as described in Example 6, 1,2,3,4,5,6-hexahydro-1,5-methano-1-phenyl-3-benzazocin-4-one is obtained.

EXAMPLE 8

1,2,3,4,5,6-hexahydro-1,5-methano-N-methyl-1-phenyl-3-benzazocine

Lithium aluminum hydride (1 g.) is added portionwise to a solution of 1,2,3,4,5,6-hexahydro-1,5-methano-N-methyl-1-phenyl-3-benzazocin-4-one (2.8 g., obtained as described in Example 7) in anhydrous tetrahydrofuran and refluxed overnight. The resulting suspension is treated cautiously with 5 ml. of water and filtered. Evaporation of the solvent yields the title compound as an oil $\nu_{max.}^{CHCl_3}$ 3050, 2930, 2775, 1600, 1490, 1445, 695 cm.$^{-1}$ Treatment with ethereal hydrogen chloride yields the corresponding hydrochloride salt, M.P. 263–266° C. (dec.) after crystallization from isopropanol-ether.

EXAMPLE 9

1,2,3,4,5,6-hexahydro-1,5-methano-1-phenyl-3-benzazocine

A solution of 1,2,3,4,5,6-hexahydro-1,5-methano-N-methyl-1-phenyl-3-benzazocine, prepared as described in Example 8, in anhydrous benzene is heated under reflux for twenty-four hours with ethyl chloroformate. The resulting solution is cooled, extracted with dilute hydrochloric acid, washed, then dried and evaporated to give the corresponding N-carbethoxy compound. This in turn is heated with potassium hydroxide in diethylene glycol solution at 150° C. for twenty hours, cooled, diluted with water, extracted with benzene, and the solvent evaporated to yield the title compound $\nu_{max.}^{CHCl_3}$ 3400 cm.$^{-1}$

EXAMPLE 10

1,2,3,4,5,6-hexahydro-1,5-methano-N-ethyl-1-phenyl-3-benzazocine

A solution of 1,2,3,4,5,6-hexahydro - 1,5-methano-1-phenyl-3-benzazocine, prepared as described in Example 9, in benzene is treated with a molar equivalent of sodium hydride and is heated at reflux for one hour. The solution is cooled and ethyl iodide is added. The mixture is then heated under reflux for 2.5 hours, cooled, filtered, and evaporated to give the title compound.

In a similar manner but using allyl bromide, 3,3-dimethylallyl bromide, 2-anilinoethyl bromide, 3-anilinopropyl iodide, phenethyl bromide, 3-phenylpropyl iodide, cinnamyl chloride, 2 - (p-aminophenethyl)bromide or 3-(p-aminophenyl)propyl iodide, the corresponding 1,2,3,4,5,6-hexahydro - 1,5 - methano-N-allyl-, N-dimethylallyl-, N-anilinoethyl-, N-anilinopropyl-, N-phenethyl-, N-phenylpropyl-, N-cinnamyl-, N-2-(p-aminophenethyl)- and N - 3 - (p-aminophenyl)propyl - 1 - phenyl - 3 - benzazocines are obtained.

We claim:
1. A compound selected from the group which consists of compounds of the formula

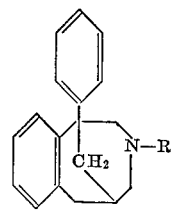

wherein R represents hydrogen, alkyl containing from one to nine carbon atoms, allyl, 3,3 - dimethylallyl, 2-anilinoethyl, 3-anilinopropyl, phenethyl, 3-phenylpropyl, cinnamyl, 2-(p-aminophenethyl), or 3-(p-aminophenyl) propyl; and non-toxic, pharmaceutically acceptable acid addition salts thereof.

2. A compound as described in claim 1 of the formula

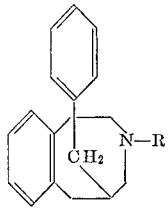

wherein R represents hydrogen, alkyl containing from one to nine carbon atoms, allyl, 3,3-dimethylallyl, 2-anilinoethyl, 3-anilinopropyl, phenethyl, 3-phenylpropyl, cinnamyl, 2-(p-aminophenethyl), or 3-(p-aminophenyl) propyl.

3. A compound as described in claim 1 which is 1,2,3,4,5,6-hexahydro - 1,5 - methano-1-phenyl-3-benzazocine.

4. A compound as described in claim 1 which is 1,2,3,4,5,6 - hexahydro - 1,5 - methano-N-methyl-1-phenyl-3-benzazocine.

5. A compound as described in claim 1 which is the hydrochloride salt of 1,2,3,4,5,6-hexahydro-1-methano-N-methyl-1-phenyl-3-benzazocine.

6. The process for preparing the N-sodio derivative of 1,2,3,4,5,6 - hexahydro-1,5-methano - 1 - phenyl-3-benzazocine - 4,6 - dione by cyclization of (4-phenyl-1-tetralone-4)methyl isocyanate, which comprises heating (4-phenyl-1-tetralone-4)methyl isocyanate with a molar excess of sodium hydride in an inert solvent.

7. In a process as claimed in claim 6, the step of treating the N-sodio derivative of 1,2,3,4,5,6-hexahydro-1,5-methano-1-phenyl-3-benzazocine-4,6 - dione with water, thus securing 1,2,3,4,5,6 - hexahydro - 1,5 - methano-1-phenyl-3-benzazocine-4,6-dione.

8. In a process as claimed in claim 6 the step of treating the N-sodio derivative of 1,2,3,4,5,6-hexahydro-1,5-methano-1-phenyl-3-benzazocine-4,6-dione with a methyl halide selected from the group consisting of methyl chloride, methyl bromide and methyl iodide to obtain 1,2,3,4,5,6-hexahydro-1,5-methano - N - methyl-1-phenyl-3-benzazocine-4,6-dione.

References Cited
UNITED STATES PATENTS

| | | | |
|---|---|---|---|
| 3,118,900 | 1/1964 | Zaugg et al. | 260—294.7 |
| 3,320,265 | 5/1967 | Clarke | 260—294.7 |

OTHER REFERENCES

Walker et al., J. Org. Chem. 32 (7), 2213–25 (1967).

HENRY R. JILES, Primary Examiner

G. T. TODD, Assistant Examiner

U.S. Cl. R.X.

260—240, 294.7, 453, 515, 999